(12) United States Patent
Liao et al.

(10) Patent No.: US 11,356,679 B2
(45) Date of Patent: Jun. 7, 2022

(54) METHOD AND APPARATUS FOR CHROMA SAMPLING

(71) Applicant: ALIBABA GROUP HOLDING LIMITED, Grand Cayman (KY)

(72) Inventors: Ru-Ling Liao, Beijing (CN); Jie Chen, Beijing (CN); Yan Ye, San Mateo, CA (US); Jiancong Luo, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/063,064

(22) Filed: Oct. 5, 2020

(65) Prior Publication Data

US 2021/0176479 A1   Jun. 10, 2021

Related U.S. Application Data

(60) Provisional application No. 62/944,345, filed on Dec. 5, 2019.

(51) Int. Cl.
| H04N 19/14 | (2014.01) |
| H04N 19/103 | (2014.01) |
| H04N 19/172 | (2014.01) |
| H04N 19/186 | (2014.01) |

(52) U.S. Cl.
CPC ......... H04N 19/186 (2014.11); H04N 19/103 (2014.11); H04N 19/14 (2014.11); H04N 19/172 (2014.11)

(58) Field of Classification Search
None
See application file for complete search history.

(56) References Cited

U.S. PATENT DOCUMENTS

| 10,091,512 B2 * | 10/2018 | Xu ........................ G06V 10/40 |
| 10,321,141 B2 * | 6/2019 | Chuang .................. H04N 19/13 |
| 10,484,696 B2 * | 11/2019 | Sun ........................ H04N 19/93 |
| 2013/0057639 A1 * | 3/2013 | Ralston .............. H04N 21/4728 |
| | | 348/14.02 |
| 2013/0163666 A1 * | 6/2013 | Leontaris ............ H04N 19/172 |
| | | 375/240.12 |
| 2013/0258084 A1 * | 10/2013 | Deng ............... H04N 21/44218 |
| | | 348/77 |

(Continued)

OTHER PUBLICATIONS

Ohm et al.; "High efficiency video coding: the next frontier in video compression" [Standards in a Nutshell], DOI: 10.1109/MSP.20122219672 IEEE Dec. 11, 2012 (3 pgs.).

(Continued)

*Primary Examiner* — Mohammad J Rahman
(74) *Attorney, Agent, or Firm* — Finnegan, Henderson, Farabow, Garrett & Dunner, LLP

(57) ABSTRACT

The present disclosure provides methods and apparatuses for processing chroma sampled pictures. An exemplary video processing method includes: determining whether a chroma component is included in a sequence of frames; and in response to a determination that the chroma component is included in the sequence, activating a sub-process for processing the sequence, wherein the sub-process comprises one or more of joint coding for chroma residues (JCCR), block differential pulse coded modulation (BDPCM), palette mode, or adaptive color transform (ACT).

21 Claims, 19 Drawing Sheets

(56) References Cited

U.S. PATENT DOCUMENTS

| | | | | |
|---|---|---|---|---|
| 2016/0227226 | A1* | 8/2016 | Rapaka | H04N 19/182 |
| 2016/0227247 | A1* | 8/2016 | Zou | H03M 7/4075 |
| 2016/0261875 | A1* | 9/2016 | Zheng | H04N 19/176 |
| 2016/0309177 | A1* | 10/2016 | Laroche | H04N 19/93 |
| 2016/0338604 | A1* | 11/2016 | Wang | G06K 9/622 |
| 2016/0343130 | A1* | 11/2016 | Wang | G06K 9/00114 |
| 2016/0343135 | A1* | 11/2016 | De Haan | G06K 9/4652 |
| 2016/0345014 | A1* | 11/2016 | Kim | H04N 19/593 |
| 2017/0078683 | A1* | 3/2017 | Seregin | H04N 19/44 |
| 2017/0332091 | A1* | 11/2017 | Maeda | H04N 19/146 |
| 2018/0041757 | A1* | 2/2018 | Liu | H04N 19/186 |
| 2018/0288415 | A1* | 10/2018 | Li | H04N 19/13 |
| 2018/0352225 | A1* | 12/2018 | Guo | H04N 19/136 |
| 2019/0238817 | A1* | 8/2019 | Jun | H04N 9/825 |
| 2019/0261010 | A1* | 8/2019 | Luo | H04N 19/40 |

OTHER PUBLICATIONS

Sullivan et al.; "Overview of the High Efficiency Video Coding (HEVC) Standard," IEEE Transactions on Circuits and Systems for Video Technology, vol. 22, No. 12, pp. 1649-1668, Dec. 12, 2012 (20 pgs.).

Chen et al.; "Algorithm Description of Joint Exploration Test Model 7 (JEM7)", JVET-G1001-vl, Jul. 13-21, 2017 (50 pgs.).

Segall, et al.; "Joint Call for Proposals on Video Compression with Capability beyond HEVC," JVET-H1002 (v6), Oct. 18-24, 2017 (28 pgs.).

"Requirement for a Future Video Coding Standard v5"; ISO/IEC JTC1/SC29/WG11 N17074, Jul. 2017, Tornio, IT (15 pgs.).

Joshi et al.; "High Efficiency Video Coding (HEVC) Screen Content Coding: Draft 6"; JCTVC-W1005-v1, Feb. 19-26, 2016 (675 pgs.).

* cited by examiner

Table 1: Exemplary chroma formats in VVC

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

FIG. 5

Table 2: Exemplary chroma format related syntax

| seq_parameter_set_rbsp( ) { |
|---|
|   sps_decoding_parameter_set_id |
|   sps_video_parameter_set_id |
|   sps_max_sublayers_minus1 |
|   sps_reserved_zero_4bits |
|   sps_ptl_dpb_hrd_params_present_flag |
|   if( sps_ptl_dpb_hrd_params_present_flag ) |
|     profile_tier_level( 1, sps_max_sublayers_minus1 ) |
|   gdr_enabled_flag |
|   sps_seq_parameter_set_id |
|   *chroma_format_idc* |
|   *if( chroma_format_idc  = =  3 )* |
|     *separate_colour_plane_flag* |
|   ref_pic_resampling_enabled_flag |
|   ... |
| } |

FIG. 6

Table 3: Exemplary reconstruction of chroma residuals

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x ][ y ] ) >> 1<br>resCr[ x ][ y ] = resJointC[ x ][ y ] | 3 |

FIG. 7

Table 4: Exemplary JCCR mode related syntax <Part 1>

| |
|---|
| seq_parameter_set_rbsp( ) { |
| ... |
| *sps_joint_cbcr_enabled_flag* |
|   if( ChromaArrayType != 0 ) { |
|     same_qp_table_for_chroma |
|       numQpTables = same_qp_table_for_chroma ? 1 : ( sps_joint_cbcr_enabled_flag ? 3 : 2 ) |
|       for( i = 0; i < numQpTables; i++ ) { |
|         qp_table_start_minus26[ i ] |
|         num_points_in_qp_table_minus1[ i ] |
|         for( j = 0; j <= num_points_in_qp_table_minus1[ i ]; j++ ) { |
|           delta_qp_in_val_minus1[ i ][ j ] |
|           delta_qp_diff_val[ i ][ j ] |
|         } |
|       } |
|   } |
| ... |
| } |
| picture_header_rbsp( ) { |
| ... |
|   if ( sps_ibc_enabled_flag ) |
|     pic_six_minus_max_num_ibc_merge_cand |
|   *if( sps_joint_cbcr_enabled_flag )* |
|     *pic_joint_cbcr_sign_flag* |
|   if( sps_sao_enabled_flag ) { |
|     pic_sao_enabled_present_flag |
| ... |
| } |
| slice_header( ) { |
| ... |
|   slice_qp_delta |
|   if( pps_slice_chroma_qp_offsets_present_flag ) { |
|     slice_cb_qp_offset |
|     slice_cr_qp_offset |
|     *if( sps_joint_cbcr_enabled_flag )* |
|       *slice_joint_cbcr_qp_offset* |
|   } |
| ... |
| } |

FIG. 8

Table 4: Exemplary JCCR mode related syntax <Part II>

| transform_unit( x0, y0, tbWidth, tbHeight, treeType, subTuIndex, chType ) { |
|---|
| ... |
| if( sps_joint_cbcr_enabled_flag && ( ( CuPredMode[ chType ][ x0 ][ y0 ] == MODE_INTRA<br>&& ( tu_cbf_cb[ xC ][ yC ] \|\| tu_cbf_cr[ xC ][ yC ] ) ) \|\|<br>( tu_cbf_cb[ xC ][ yC ] && tu_cbf_cr[ xC ][ yC ] ) ) && chromaAvailable ) |
| tu_joint_cbcr_residual_flag[ xC ][ yC ] |
| if( tu_cbf_luma[ x0 ][ y0 ] && treeType != DUAL_TREE_CHROMA ) { |
| ... |
| } |

FIG. 8 (Continued)

Table 5: Exemplary BDPCM related syntax

| |
|---|
| seq_parameter_set_rbsp( ) { |
| ... |
|   sps_alf_enabled_flag |
|   sps_transform_skip_enabled_flag |
|   if( sps_transform_skip_enabled_flag ) |
|     *sps_bdpcm_enabled_flag* |
|   *if( sps_bdpcm_enabled_flag && chroma_format_idc == 3 )* |
|     *sps_bdpcm_chroma_enabled_flag* |
|   sps_ref_wraparound_enabled_flag |
| ... |
| } |
| coding_unit( x0, y0, cbWidth, cbHeight, cqtDepth, treeType, modeType ) { |
| ... |
|     *if( sps_bdpcm_enabled_flag &&*<br>        *cbWidth <= MaxTsSize && cbHeight <= MaxTsSize )* |
|       *intra_bdpcm_luma_flag* |
|     *if( intra_bdpcm_luma_flag )* |
|       *intra_bdpcm_luma_dir_flag* |
| ... |
|     if( !cu_act_enabled_flag ) { |
|       *if( cbWidth <= MaxTsSize && cbHeight <= MaxTsSize &&*<br>        *sps_bdpcm_chroma_enabled_flag ) {* |
|         *intra_bdpcm_chroma_flag* |
|       *if( intra_bdpcm_chroma_flag )* |
|         *intra_bdpcm_chroma_dir_flag* |
|     } else { |
| ... |
| } |

FIG. 9

Exemplary block coded in palette mode

Table 6: Exemplary palette mode related syntax

| seq_parameter_set_rbsp( ) { |
|---|
| ... |
|   if( chroma_format_idc == 3 ) { |
|     *sps_palette_enabled_flag* |
|     *sps_act_enabled_flag* |
|   } |
| ... |
| } |

FIG. 11

Table 7: Exemplary palette mode related syntax

| seq_parameter_set_rbsp( ) { |
|---|
| ... |
|   if( chroma_format_idc == 3 ) { |
|     sps_palette_enabled_flag |
|     *sps_act_enabled_flag* |
|   } |
| ... |
| } |

FIG. 13

Table 8: Exemplary syntax for signaling whether a coding tool is enabled

| |
|---|
| seq_parameter_set_rbsp( ) { |
| ... |
| sps_max_luma_transform_size_64_flag |
| 1401 ~~sps_joint_cbcr_enabled_flag~~ |
| if( ChromaArrayType != 0 ) { |
| 1402 *sps_joint_cbcr_enabled_flag* |
| same_qp_table_for_chroma |
| numQpTables = same_qp_table_for_chroma ? 1 : ( sps_joint_cbcr_enabled_flag ? 3 : 2 ) |
| for( i = 0; i < numQpTables; i++ ) { |
| qp_table_start_minus26[ i ] |
| num_points_in_qp_table_minus1[ i ] |
| for( j = 0; j <= num_points_in_qp_table_minus1[ i ]; j++ ) { |
| delta_qp_in_val_minus1[ i ][ j ] |
| delta_qp_diff_val[ i ][ j ] |
| } |
| } |
| } |
| sps_sao_enabled_flag |
| sps_alf_enabled_flag |
| sps_transform_skip_enabled_flag |
| if( sps_transform_skip_enabled_flag ) |
| sps_bdpcm_enabled_flag                                                1403 |
| if( sps_bdpcm_enabled_flag && chroma_format_idc == 3 *&& ChromaArrayType != 0*) |
| sps_bdpcm_chroma_enabled_flag |
| ... |
| if( chroma_format_idc == 3 ) { |
| sps_palette_enabled_flag |
| 1404 *if( ChromaArrayType != 0 ) {* |
| sps_act_enabled_flag |
| 1405 *}* |
| } |
| ... |
| } |

FIG. 14

Table 9: Exemplary syntax for signaling whether a coding tool is enabled

|  |
|---|
| seq_parameter_set_rbsp( ) { |
| ... |
|   sps_max_luma_transform_size_64_flag |
|   ~~sps_joint_cbcr_enabled_flag~~   *(1501)* |
|   if( ChromaArrayType != 0 ) { |
|     sps_joint_cbcr_enabled_flag   *(1502)* |
|     same_qp_table_for_chroma |
|     numQpTables = same_qp_table_for_chroma ? 1 : ( sps_joint_cbcr_enabled_flag ? 3 : 2 ) |
|     for( i = 0; i < numQpTables; i++ ) { |
|       qp_table_start_minus26[ i ] |
|       num_points_in_qp_table_minus1[ i ] |
|       for( j = 0; j <= num_points_in_qp_table_minus1[ i ]; j++ ) { |
|         delta_qp_in_val_minus1[ i ][ j ] |
|         delta_qp_diff_val[ i ][ j ] |
|       } |
|     } |
|   } |
|   sps_sao_enabled_flag |
|   sps_alf_enabled_flag |
|   sps_transform_skip_enabled_flag |
|   if( sps_transform_skip_enabled_flag ) |
|     sps_bdpcm_enabled_flag   *(1503)* |
|   if( sps_bdpcm_enabled_flag && ~~chroma_format_idc == 3~~ ChromaArrayType != 0 ) |
|     sps_bdpcm_chroma_enabled_flag |
| ... |
|   if( chroma_format_idc == 3 ) { |
|     sps_palette_enabled_flag |
|     *if( ChromaArrayType != 0 ) {*   *(1504)* |
|     sps_act_enabled_flag |
|     *}*   *(1505)* |
|   } |
| ... |
| } |

FIG. 15

Table 10: Exemplary syntax for signaling whether a coding tool is enabled

| seq_parameter_set_rbsp( ) { |
|---|
| ... |
| sps_max_luma_transform_size_64_flag |
| 1601  ~~sps_joint_cbcr_enabled_flag~~ |
| if( ChromaArrayType != 0 ) { |
| 1602    sps_joint_cbcr_enabled_flag |
|   same_qp_table_for_chroma |
|   numQpTables = same_qp_table_for_chroma ? 1 : ( sps_joint_cbcr_enabled_flag ? 3 : 2 ) |
|   for( i = 0; i < numQpTables; i++ ) { |
|     qp_table_start_minus26[ i ] |
|     num_points_in_qp_table_minus1[ i ] |
|     for( j = 0; j <= num_points_in_qp_table_minus1[ i ]; j++ ) { |
|       delta_qp_in_val_minus1[ i ][ j ] |
|       delta_qp_diff_val[ i ][ j ] |
|     } |
|   } |
| } |
| sps_sao_enabled_flag |
| sps_alf_enabled_flag |
| sps_transform_skip_enabled_flag |
| if( sps_transform_skip_enabled_flag ) |
|   sps_bdpcm_enabled_flag                                                1603 |
| if( sps_bdpcm_enabled_flag && chroma_format_idc == 3 *&& ChromaArrayType != 0*) |
|   sps_bdpcm_chroma_enabled_flag |
| ...                                                          1604 |
| if( chroma_format_idc == 3 *&& ChromaArrayType != 0*) { |
|   sps_palette_enabled_flag |
|   sps_act_enabled_flag |
| } |
| ... |
| } |

FIG. 16

Table 11: Exemplary syntax for signaling whether a coding tool is enabled

| seq_parameter_set_rbsp( ) { |  |
|---|---|
| ... |  |
|   sps_max_luma_transform_size_64_flag |  |
|   ~~sps_joint_cbcr_enabled_flag~~ | |
|   if( ChromaArrayType != 0 ) { |  |
|     *sps_joint_cbcr_enabled_flag* | |
|     same_qp_table_for_chroma |  |
|     numQpTables = same_qp_table_for_chroma ? 1 : ( sps_joint_cbcr_enabled_flag ? 3 : 2 ) |  |
|     for( i = 0; i < numQpTables; i++ ) { |  |
|       qp_table_start_minus26[ i ] |  |
|       num_points_in_qp_table_minus1[ i ] |  |
|       for( j = 0; j <= num_points_in_qp_table_minus1[ i ]; j++ ) { |  |
|         delta_qp_in_val_minus1[ i ][ j ] |  |
|         delta_qp_diff_val[ i ][ j ] |  |
|       } |  |
|     } |  |
|   } |  |
|   sps_sao_enabled_flag |  |
|   sps_alf_enabled_flag |  |
|   sps_transform_skip_enabled_flag |  |
|   if( sps_transform_skip_enabled_flag ) |  |
|     sps_bdpcm_enabled_flag |  |
|   if( sps_bdpcm_enabled_flag && chroma_format_idc == 3 *&& ChromaArrayType != 0*) |  |
|     sps_bdpcm_chroma_enabled_flag |  |
|   ... |  |
|   if( chroma_format_idc == 3 *|| chroma_format_idc == 0*) { |  |
|     sps_palette_enabled_flag |  |
|   *}* | |
|   *if( chroma_format_idc == 3 && ChromaArrayType != 0 ) {* | |
|     sps_act_enabled_flag |  |
|   } |  |
|   ... |  |
| } |  |

METHOD AND APPARATUS FOR CHROMA SAMPLING

CROSS-REFERENCE TO RELATED APPLICATIONS

The present disclosure claims priority to U.S. Provisional Application No. 62/944,345, filed on Dec. 5, 2019, which is incorporated herein by reference in its entirety.

TECHNICAL FIELD

The present disclosure generally relates to video processing, and more particularly, to methods and apparatuses for processing chroma sampled pictures.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher

SUMMARY OF THE DISCLOSURE

In some embodiments, an exemplary video processing method includes: determining whether a chroma component is included in a sequence of frames; and in response to a determination that the chroma component is included in the sequence, activating a sub-process for processing the sequence, wherein the sub-process comprises one or more of joint coding for chroma residues (JCCR), block differential pulse coded modulation (BDPCM), palette mode, or adaptive color transform (ACT).

In some embodiments, an exemplary video processing apparatus includes at least one memory for storing instructions and at least one processor. The at least one processor is configured to execute the instructions to cause the apparatus to perform: determining whether a chroma component is included in a sequence of frames; and in response to a determination that the chroma component is included in the sequence, activating a sub-process for processing the sequence, wherein the sub-process comprises one or more of joint coding for chroma residues (JCCR), block differential pulse coded modulation (BDPCM), palette mode, or adaptive color transform (ACT).

In some embodiments, an exemplary non-transitory computer readable storage medium stores a set of instructions. The set of instructions are executable by one or more processing devices to cause a video processing apparatus to perform: determining whether a chroma component is included in a sequence of frames; and in response to a determination that the chroma component is included in the sequence, activating a sub-process for processing the sequence, wherein the sub-process comprises one or more of joint coding for chroma residues (JCCR), block differential pulse coded modulation (BDPCM), palette mode, or adaptive color transform (ACT).

BRIEF DESCRIPTION OF THE DRAWINGS

Embodiments and various aspects of the present disclosure are illustrated in the following detailed description and the accompanying figures. Various features shown in the figures are not drawn to scale.

FIG. 5 illustrates an exemplary Table 1 showing exemplary chroma format in Versatile Video Coding (VVC), according to some embodiments of the present disclosure.

FIG. 6 illustrates an exemplary Table 2 showing exemplary chroma format related syntax, according to some embodiments of the present disclosure.

FIG. 7 illustrates an exemplary Table 3 showing exemplary reconstruction of chroma residuals, according to some embodiments of the present disclosure.

FIG. 8 illustrates an exemplary Table 4 showing exemplary joint coding for chroma residuals (JCCR) mode related syntax, according to some embodiments of the present disclosure.

FIG. 9 illustrates an exemplary Table 5 showing exemplary block differential pulse coded modulation (BDPCM) related syntax, according to some embodiments of the present disclosure.

FIG. 11 illustrates an exemplary Table 6 showing exemplary palette mode related syntax, according to some embodiments of the present disclosure.

FIG. 13 illustrates an exemplary Table 7 showing exemplary palette mode related syntax, according to some embodiments of the present disclosure.

FIG. 14 illustrates an exemplary Table 8 showing exemplary syntax for signaling whether a coding tool is enabled, according to some embodiments of the present disclosure.

FIG. 15 illustrates an exemplary Table 9 showing exemplary syntax for signaling whether a coding tool is enabled, according to some embodiments of the present disclosure.

FIG. 16 illustrates an exemplary Table 10 showing exemplary syntax for signaling whether a coding tool is enabled, according to some embodiments of the present disclosure.

FIG. 17 illustrates an exemplary Table 11 showing exemplary syntax for signaling whether a coding tool is enabled, according to some embodiments of the present disclosure.

DETAILED DESCRIPTION

Figure 1:
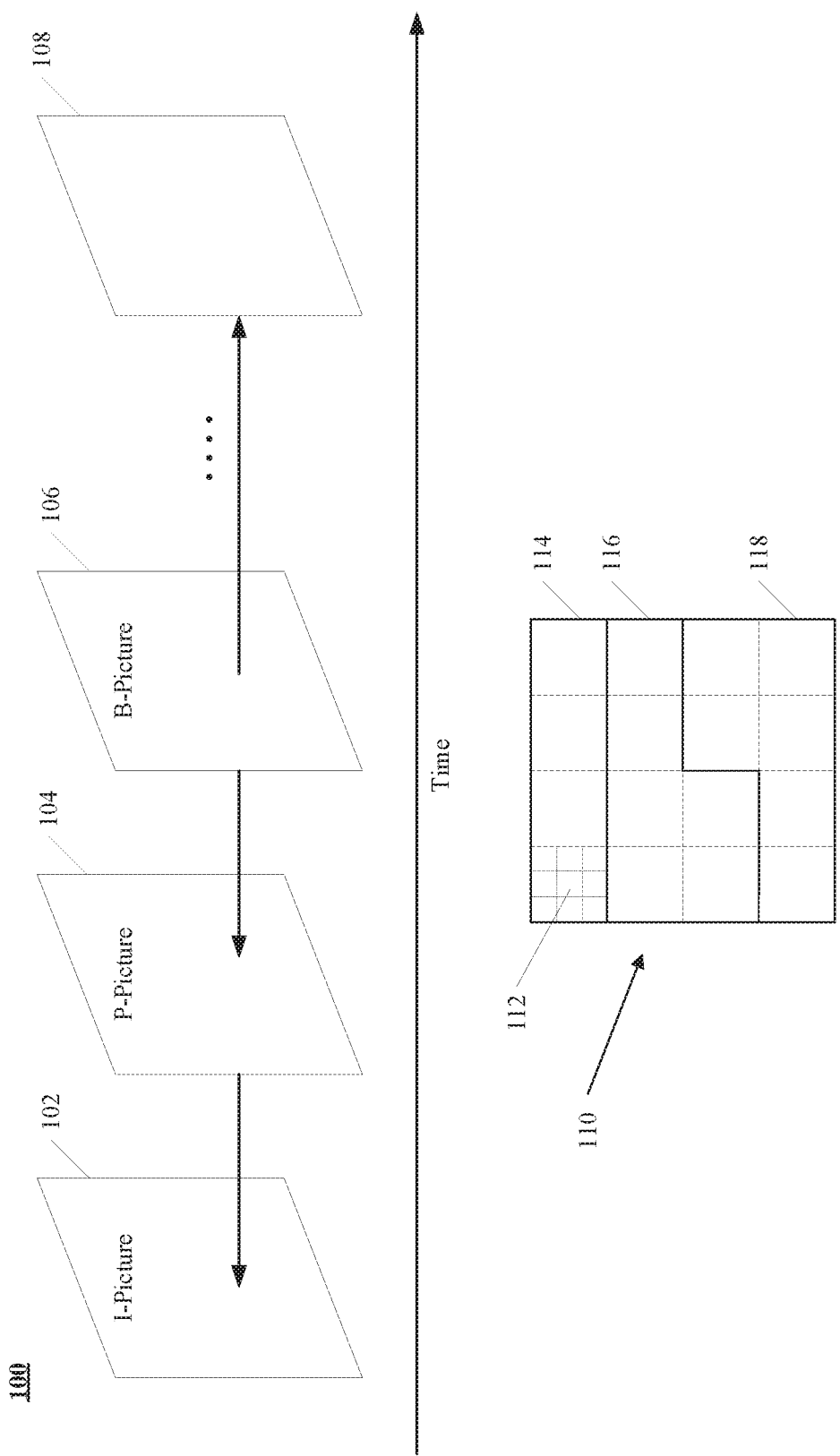
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC. The VCEG and MPEG have formally started the development of next generation video compression standard beyond HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266NVC). Any operation performed to a basic processing unit can be repeatedly performed to each of its luma and chroma components.

Figure 2:
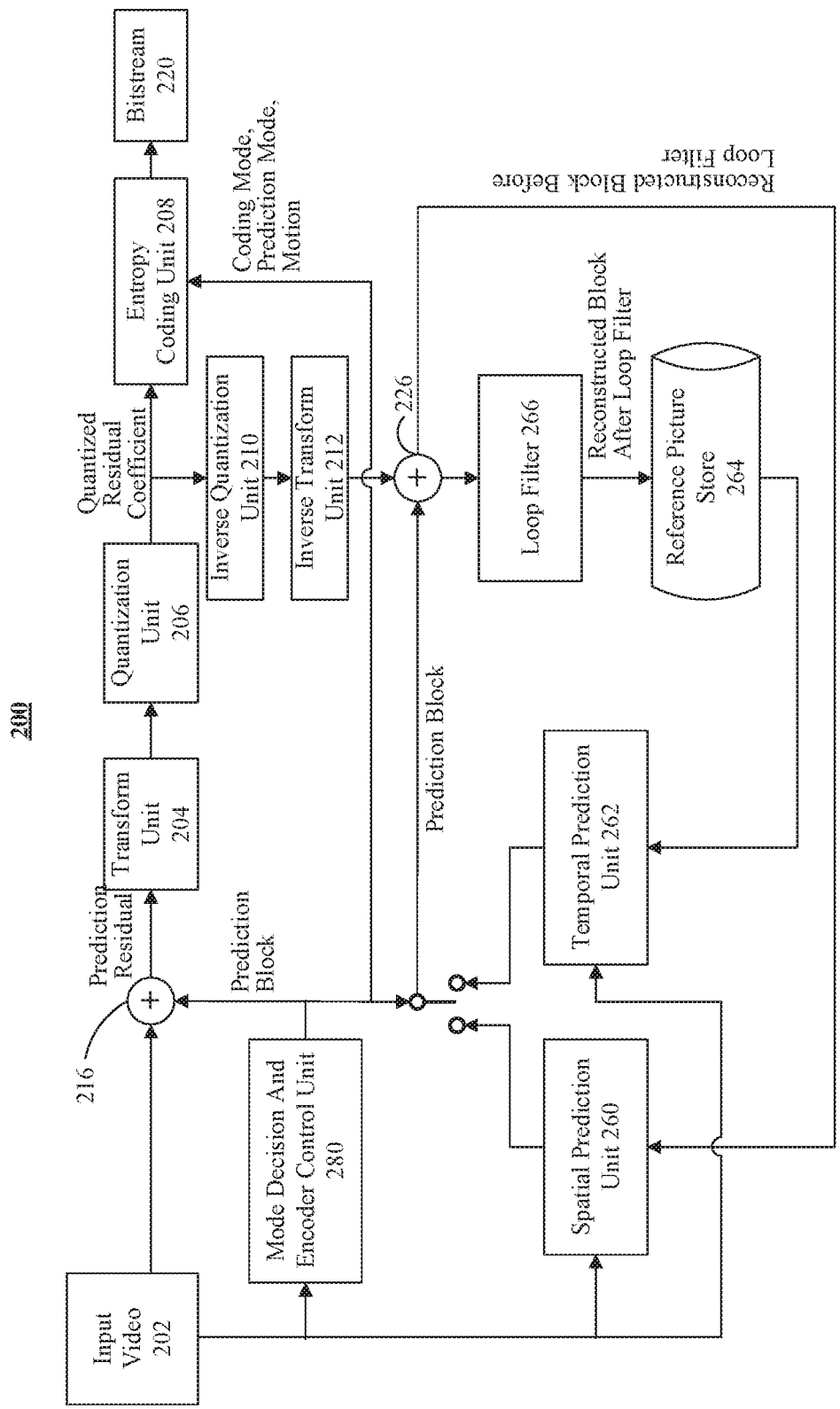
FIG. 2 illustrates a schematic diagram of an exemplary encoder in a hybrid video coding system, according to some embodiments of the present disclosure.
Figure 3:
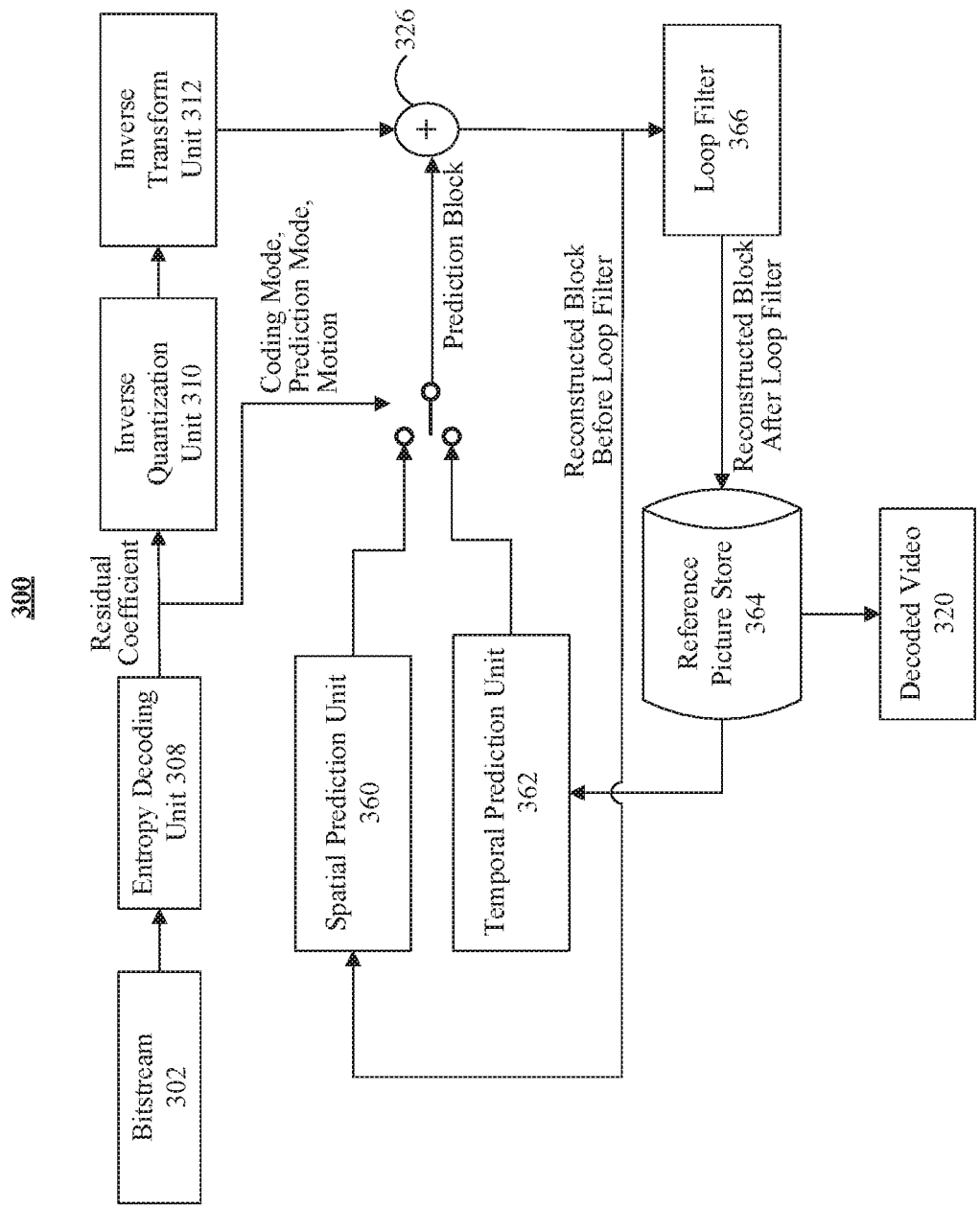
FIG. 3 illustrates a schematic diagram of an exemplary decoder in a hybrid video coding system, according to some embodiments of the present disclosure.

Video coding has multiple stages of operations, examples of which are shown in FIG. 2 and FIG. 3. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which is shown in FIG. 2), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIG. 2), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIG. 2), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2 illustrates a schematic diagram of an exemplary encoder 200 in a hybrid video coding system, according to some embodiments of the present disclosure. Video encoder 200 may perform intra- or inter-coding of blocks within video frames, including video blocks, or partitions or sub-partitions of video blocks. Intra-coding may rely on spatial prediction to reduce or remove spatial redundancy in video within a given video frame. Inter-coding may rely on temporal prediction to reduce or remove temporal redundancy in video within adjacent frames of a video sequence. Intra modes may refer to a number of spatial based compression modes. Inter modes (such as uni-prediction or bi-prediction) may refer to a number of temporal-based compression modes.

Referring to FIG. 2, input video signal 202 may be processed block by block. For example, the video block unit may be a 16×16 pixel block (e.g., a macroblock (MB)). The size of the video block units may vary, depending on the coding techniques used, and the required accuracy and efficiency. In HEVC, extended block sizes (e.g., a coding tree unit (CTU)) may be used to compress video signals of resolution, e.g., 1080p and beyond. In HEVC, a CTU may include up to 64×64 luma samples corresponding chroma samples, and associated syntax elements. In VVC, the size of a CTU may be further increased to include 128×128 luma samples, corresponding chroma samples, and associated syntax elements. A CTU can be further divided into coding units (CUs) using, for example, quad-tree, binary tree, or ternary tree. A CU may be further partitioned into prediction units (PUs), for which separate prediction methods may be applied. Each input video block may be processed by using spatial prediction unit 260 or temporal prediction unit 262.

Spatial prediction unit 260 performs spatial prediction (e.g., intra prediction) to the current block/CU using information on the same picture/slice containing the current block. Spatial prediction may use pixels from the already coded neighboring blocks in the same video picture frame/slice to predict the current video block. Spatial prediction may reduce spatial redundancy inherent in the video signal.

Temporal prediction unit 262 performs temporal prediction (e.g., inter prediction) to the current block using information from picture(s)/slice(s) different from the picture/slice containing the current block. Temporal prediction for a video block may be signaled by one or more motion vectors. In unit-directional temporal prediction, only one motion vector indicating one reference picture is used to generate the prediction signal for the current block. On the other hand, in bi-directional temporal prediction, two motion vectors, each indicating a respective reference picture, can be used to generate the prediction signal for the current block. The motion vectors may indicate the amount and the direction of motion between the current block and one or more associated block(s) in the reference frames. If multiple reference pictures are supported, one or more reference picture indices may be sent for a video block. The one or more reference indices may be used to identify from which reference picture(s) in the reference picture store or decoded picture buffer (DPB) 264, the temporal prediction signal may come.

Mode decision and encoder control unit 280 in the encoder may choose the prediction mode, for example, based on rate-distortion optimization. Based on the determined prediction mode, the prediction block can be obtained. The prediction block may be subtracted from the current video block at adder 216. The prediction residual may be transformed by transformation unit 204 and quantized by quantization unit 206. The quantized residual coefficients may be inverse quantized at inverse quantization unit 210 and inverse transformed at inverse transform unit 212 to form the reconstructed residual. The reconstructed residual may be added to the prediction block at adder 226 to form the reconstructed video block. The reconstructed video block before loop-filtering may be used to provide reference samples for intra prediction.

The reconstructed video block may go through loop filtering at loop filter 266. For example, loop filtering such as deblocking filter, sample adaptive offset (SAO), and adaptive loop filter (ALF) may be applied. The reconstructed block after loop filtering may be stored in reference picture store 264 and can be used to provide inter prediction reference samples for coding other video blocks. To form the output video bitstream 220, coding mode (e.g., inter or intra), prediction mode information, motion information, and quantized residual coefficients may be sent to the entropy coding unit 208 to further reduce the bit rate, before the data are compressed and packed to form bitstream 220.

FIG. 3 illustrates a schematic diagram of an exemplary decoder 300 in a hybrid video coding system, according to some embodiments of the present disclosure. Referring to FIG. 3, a video bitstream 302 may be unpacked or entropy decoded at entropy decoding unit 308. The coding mode information can be used to determine whether the spatial prediction unit 360 or the temporal prediction unit 362 is to be selected. The prediction mode information can be sent to the corresponding prediction unit to generate the prediction block. For example, motion compensated prediction may be applied by the temporal prediction unit 362 to form the temporal prediction block.

The residual coefficients may be sent to inverse quantization unit 310 and inverse transform unit 312 to obtain the reconstructed residual. The prediction block and the reconstructed residual can be added together at 326 to form the reconstructed block before loop filtering. The reconstructed block may then go through loop filtering at loop filer 366. For example, loop filtering such as deblocking filter, SAO, and ALF may be applied. The reconstructed block after loop filtering can then be stored in reference picture store 364. The reconstructed data in the reference picture store 364 may be used to obtain decoded video 320, or used to predict future video blocks. Decoded video 320 may be displayed on a display device, such as a TV, a PC, a smartphone, or a tablet to be viewed by the end-users.

Figure 4:
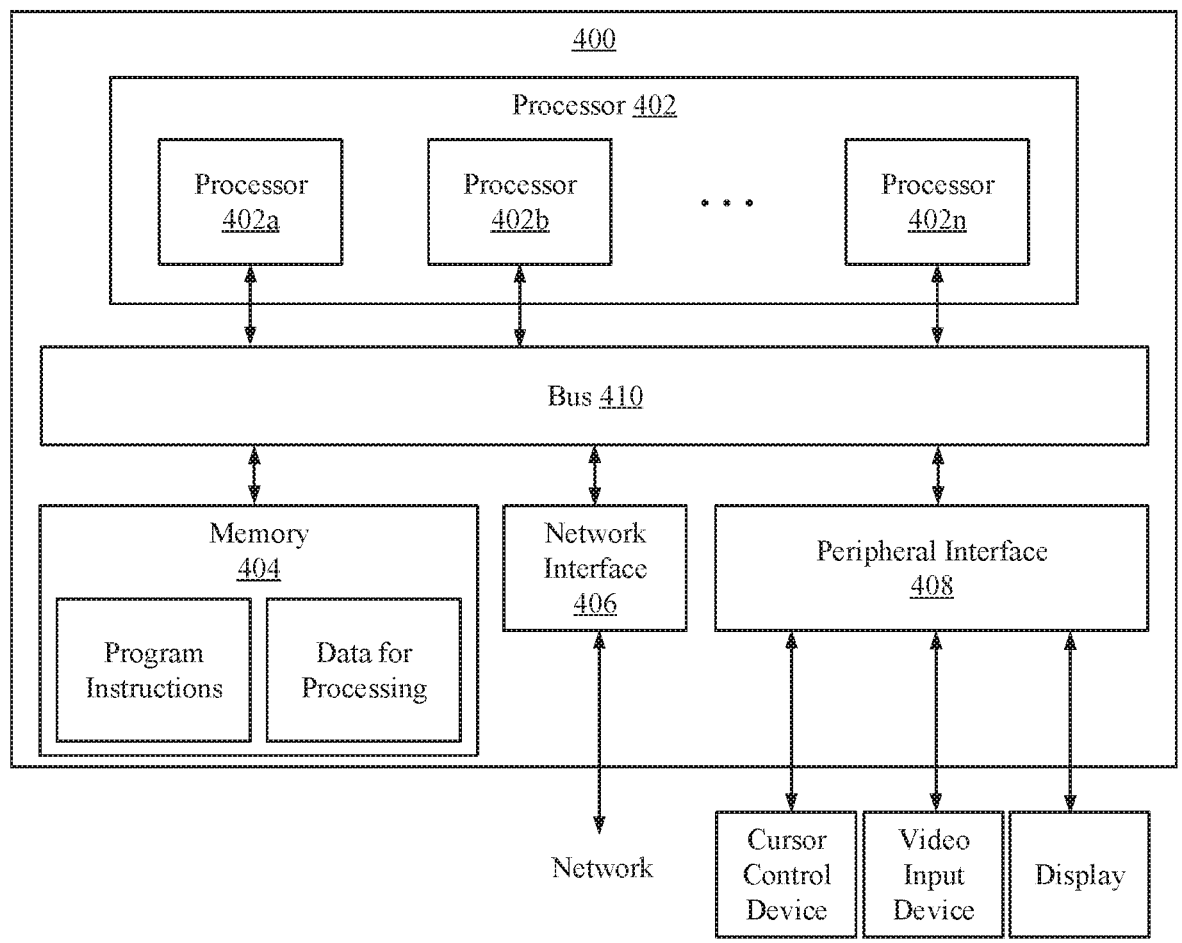
FIG. 4 illustrates a block diagram of an exemplary apparatus for encoding or decoding a video, according to some embodiments of the present disclosure.

FIG. 4 is a block diagram of an exemplary apparatus 400 for encoding or decoding a video, according to some embodiments of the present disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in FIG. 2 or FIG. 3) and data for processing. Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in the present disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs can be implemented as any combination of any software or hardware modules in apparatus 400. For example, some or all stages of encoder 200 of FIG. 2 or decoder 300 of FIG. 3 can be implemented as one or more software modules of apparatus 400, such as program instructions that can be loaded into memory 404. For another example, some or all stages of encoder 200 of FIG. 2 or decoder 300 of FIG. 3 can be implemented as one or more hardware modules of apparatus 400, such as a specialized data processing circuit (e.g., an FPGA, an ASIC, an NPU, or the like).

In the quantization and inverse quantization functional blocks (e.g., quantization unit 206 and inverse quantization unit 210 of FIG. 2, inverse quantization unit 310 of FIG. 3), a quantization parameter (QP) is used to determine the amount of quantization (and inverse quantization) applied to the prediction residuals. Initial QP values used for coding of a picture or slice may be signaled at the high level, for example, using syntax element init_qp_minus26 in the Picture Parameter Set (PPS) and using syntax element slice_qp_delta in the slice header. Further, the QP values may be adapted at the local level for each CU using delta QP values sent at the granularity of quantization groups.

In some embodiments of the present disclosure, four chroma sampling formats, i.e., monochrome, 4:2:0, 4:2:2, and 4:4:4, are supported. In monochrome sampling, there is only one sample array, which is nominally considered the luma array. In 4:2:0 sampling, each of the two chroma arrays has half of the height and half of the width of the luma array. In 4:2:2 sampling, each of the two chroma arrays has the same height and half of the width of the luma array. In 4:4:4 sampling, depending on a high level flag (e.g., syntax element separate_colour_plane_flag in Table 1 of FIG. 5) setting, three color planes can be separately processed as monochrome sampled pictures, or each of the two chroma arrays has the same height and width as the luma array. FIG. 5 illustrates an exemplary Table 1 showing exemplary chroma format in VVC, according to some embodiments of the present disclosure. As shown in Table 1 of FIG. 5, SubWidthC and SubHeightC represent the width and height of the chroma arrays, respectively.

FIG. 6 illustrates an exemplary Table 2 showing exemplary chroma format related syntax, according to some embodiments of the present disclosure. As shown in Table 2 of FIG. 6 (emphases shown in italics), the chroma format for a sequence is signaled in sequence parameter set (SPS). A variable ChromaArrayType can be derived using the signaled chroma format using the following rules. Depending on the value of syntax element separate_colour_plane_flag, the value of the variable ChromaArrayType is assigned as follows:

if syntax element separate_colour_plane_flag is equal to 0, ChromaArrayType is set equal to chroma_format_idc;

otherwise, ChromaArrayType is set equal to 0

It is noted that ChromaArrayType equal to 0 represents the monochrome format, where no chroma component exists.

Consistent with the embodiments of the present disclosure, various coding tools, including joint coding for chroma residuals (JCCR), block differential pulse coded modulation (BDPCM), adaptive color transform (ACT), and palette mode, can be supported to improve chroma coding performance. In the present disclosure, these tools are referred to as sub-processes.

Embodiments of the present disclosure can support a mode where the chroma residuals are coded jointly. Instead of separately signaling Cb and Cr chroma residuals, only one single joint chroma residual block is signaled when a transform unit (TU) is coded using this mode. FIG. 7 illustrates an exemplary Table 3 showing exemplary reconstruction of chroma residuals, according to some embodiments of the present disclosure. As depicted in Table 3 of FIG. 7, the two chroma residuals (resCb and resCr) blocks are derived using the transmitted joint chroma residual block (resJointC), tu_cbf_cb, tu_cbf_cr, and CSign. The syntax elements tu_cbf_cb and tu_cbf_cr are two flags signaled at TU level indicating whether residuals are present or not. CSign is a sign value specified in the slice header.

A flag (e.g., syntax element sps_joint_cbcr_enabled_flag in Table 4 of FIG. 8) in SPS is firstly signaled to indicate whether the JCCR mode is supported for a current sequence. FIG. 8 illustrates the exemplary Table 4 showing exemplary JCCR mode related syntax, according to some embodiments of the present disclosure. As shown in Table 4 (emphases shown in italics), when the syntax element sps_joint_cbcr_enabled_flag is true, flags in picture header, slice header and transform unit are further signaled.

Embodiments of the present disclosure can support block differential pulse coded modulation for screen content coding. For a block of size M (height)×N (width), let $r_{i,j}$, $0 \leq i \leq M-1$, $0 \leq j \leq N-1$ be the prediction residual. Let $Q(r_{i,j})$, $0 \leq i \leq M-1$, $0 \leq j \leq N-1$ denote the quantized version of the residual $r_{i,j}$. BDPCM is applied to the quantized residual values, resulting in a modified M×N array $\tilde{R}$ with elements $\tilde{r}_{i,j}$, where $\tilde{r}_{i,j}$ is predicted from its neighboring quantized residual value and is sent to the decoder. For vertical BDPCM prediction mode, for $0 \leq j \leq (N-1)$, the following equation Eq. (1) can be used to derive $\tilde{r}_{i,j}$:

$$\tilde{r}_{i,j} = \begin{cases} Q(r_{i,j}), & i = 0 \\ Q(r_{i,j}) - Q(r_{(i-1),j}), & 1 \leq i \leq (M-1) \end{cases} \quad \text{Eq. (1)}$$

For horizontal BDPCM prediction mode, for $0 \leq i \leq (M-1)$, the following equation Eq. (2) can be used to derive $\tilde{r}_{i,j}$:

$$\tilde{r}_{i,j} = \begin{cases} Q(r_{i,j}), & j = 0 \\ Q(r_{i,j}) - Q(r_{i,(j-1)}), & 1 \leq j \leq (N-1) \end{cases} \quad \text{Eq. (2)}$$

At the decoder side, the above process is reversed to compute $Q(r_{i,j})$, $0 \leq i \leq M-1$, $0 \leq j \leq N-1$, as follows:

$$Q(r_{i,j}) = \Sigma_{k=0}^{i} \tilde{r}_{k,j}, \text{ if vertical BDPCM is used} \quad \text{Eq. (3)}$$

$$Q(r_{i,j}) = \Sigma_{k=0}^{j} \tilde{r}_{i,k}, \text{ if horizontal BDPCM is used} \quad \text{Eq. (4)}$$

FIG. 9 illustrates an exemplary Table 5 showing exemplary BDPCM related syntax, according to some embodiments of the present disclosure. At the sequence level, a BDPCM enable flag (e.g., syntax element sps_bdpcm_enabled_flag) is signaled in the SPS. This flag is signaled only if the transform skip mode is enabled in the SPS, as shown in Table 5 of FIG. 9 (emphases shown in italics). When BDPCM is enabled, a flag (e.g., syntax element intra_bdpcm_luma_flag or intra_bdpcm_chroma_flag) is transmitted at the CU level. This flag indicates whether regular intra coding or BDPCM is used. If BDPCM is used, a BDPCM prediction direction flag (e.g., syntax element intra_bdpcm_luma_dir_flag or intra_bdpcm_chroma_dir_flag) is transmitted to indicate whether the prediction is horizontal or vertical.

Figure 10:
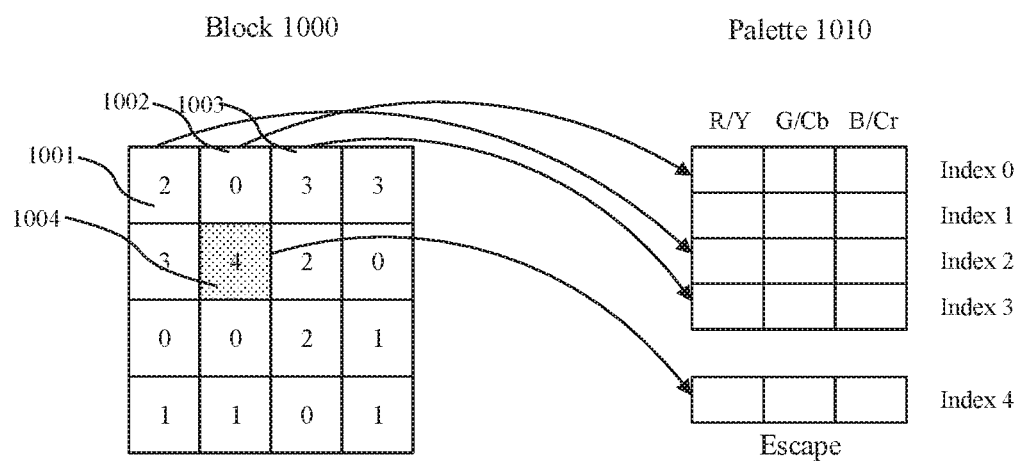
FIG. 10 illustrates a schematic diagram of an exemplary block coded in palette mode, according to some embodiments of the present disclosure.

Embodiments of the present disclosure support a palette mode to be used for screen content coding in 4:4:4 chroma format. FIG. 10 illustrates a schematic diagram of an exemplary block coded in palette mode, according to some embodiments of the present disclosure. As shown in FIG. 10, if the palette mode is utilized, the sample values (e.g., positions 1001-1004) in the CU (e.g., block 1000) are represented by a small set of representative color values. The set is referred to as the palette (e.g., palette 1010). For pixels with values close to the palette colors, the palette indices are signaled. It is also possible to specify a sample that is outside the palette by signaling an escape symbol followed by quantized component values.

FIG. 11 illustrates an exemplary Table 6 showing exemplary palette mode related syntax for signaling whether the palette mode is enabled, according to some embodiments of the present disclosure. As shown in Table 6 of FIG. 11 (emphases shown in italics), when the chroma format of a sequence is 4:4:4, a flag (e.g., syntax element sps_palette_enabled_flag) in SPS is signaled to indicate whether the palette mode is enabled in this sequence. When palette mode is enabled, a flag indicating whether palette mode is used is transmitted at the CU level if the CU size is smaller than or equal to 64×64.

Figure 12:
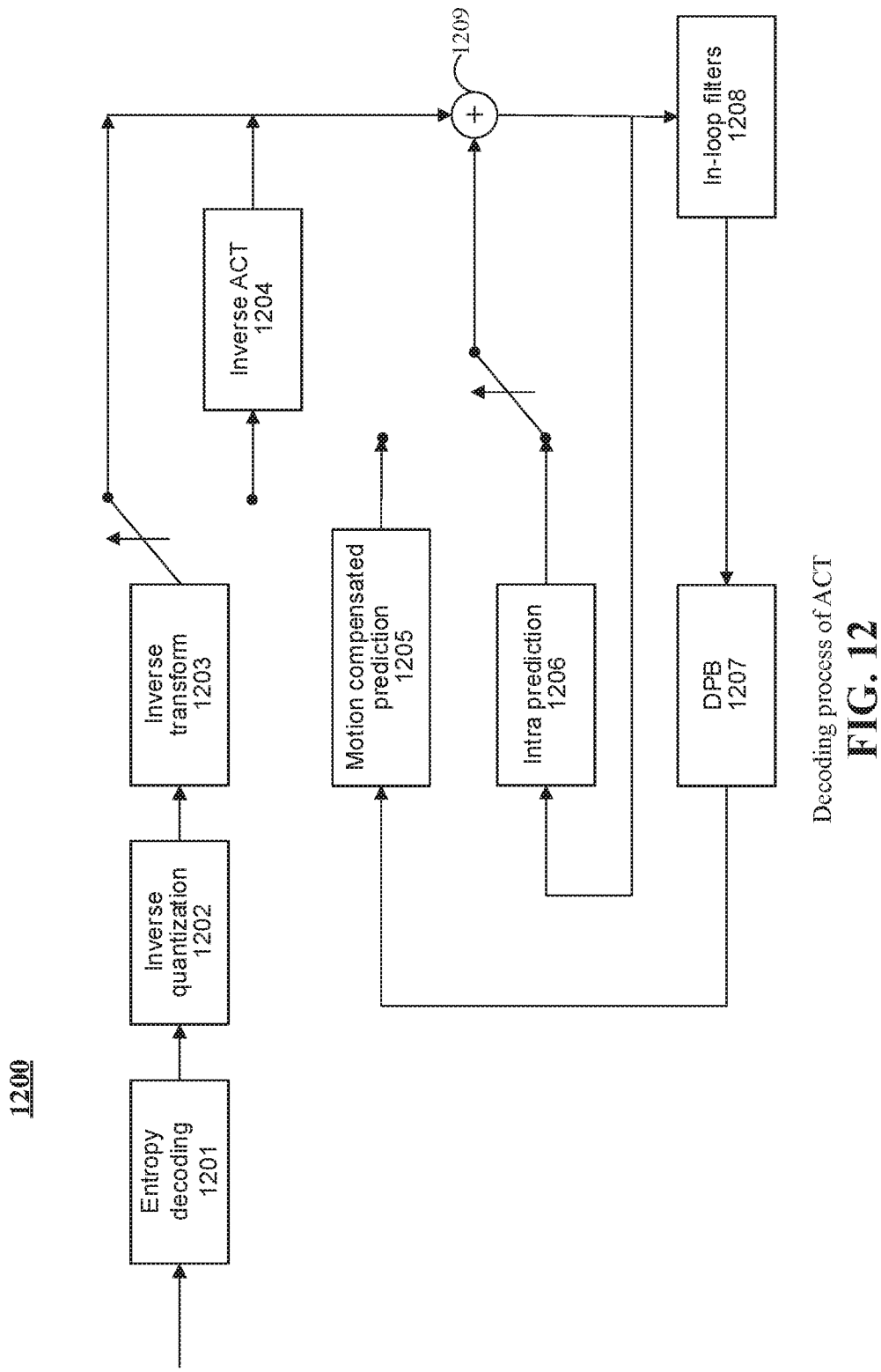
FIG. 12 illustrates a schematic diagram of an exemplary decoding process of adaptive color transform (ACT), according to some embodiments of the present disclosure.

Embodiments of the present disclosure support adaptive color transform in 4:4:4 chroma format. The color space conversion is carried out in residual domain. FIG. 12 illustrates a schematic diagram of an exemplary decoding process 1200 of adaptive color transform (ACT), according to some embodiments of the present disclosure. As illustrated in FIG. 12, the inverse ACT module 1204 is used to convert the residuals from YCgCo domain back to the original domain. Specifically, in the following equations Eq. (5) and Eq. (6), forward and inverse YCgCo color transform matrices are applied, respectively. The $C_0$, $C_1$ and $C_2$ represent the pixel values in the original domain, whereas $C'_0$, $C'_1$ and $C'_2$ represent the pixel values in the YCgCo domain.

$$\begin{bmatrix} C'_0 \\ C'_1 \\ C'_2 \end{bmatrix} = \begin{bmatrix} 2 & 1 & 1 \\ 2 & -1 & -1 \\ 0 & -2 & 2 \end{bmatrix} \begin{bmatrix} C_0 \\ C_1 \\ C_2 \end{bmatrix} / 4 \quad \text{Eq. (5)}$$

$$\begin{bmatrix} C_0 \\ C_1 \\ C_2 \end{bmatrix} = \begin{bmatrix} 1 & 1 & 0 \\ 1 & -1 & -1 \\ 1 & -1 & 1 \end{bmatrix} \begin{bmatrix} C'_0 \\ C'_1 \\ C'_2 \end{bmatrix} \quad \text{Eq. (6)}$$

FIG. 13 illustrates an exemplary Table 7 showing exemplary palette mode related syntax, according to some embodiments of the present disclosure. As shown in Table 7 of FIG. 13, when the chroma format of a sequence is 4:4:4, a flag (e.g., syntax element sps_act_enabled_flag) in SPS is signaled to indicate whether the ACT is enabled in this sequence. When ACT is enabled, a flag is transmitted at the CU level indicating ACT is applied or not.

In some embodiments of the present disclosure, some of the above-described chroma coding tools are supported and are applied to chroma components to improve the coding efficiency. However, there may be no available chroma components for applying these tools, due to the above-describes settings of chroma format. In particular, when a sequence is 4:4:4 chroma format and syntax element separate_colour_plane_flag is equal to "true", all three chroma components are treated as monochrome and effectively there are no chroma components for coding this sequence. In this case, the JCCR, BDPCM, and ACT flags are still signaled in SPS, which is redundant. Moreover, there is inconsistency in palette mode design. The palette mode cannot be enabled for monochrome case (e.g., 4:0:0 color format) but can be enabled for 4:4:4 chroma format with syntax element separate_colour_plane_flag being equal to "true."

The present disclosure provides apparatuses and methods for improving the coding efficiency for applying the JCCR, BDPCM, palette mode, and ACT to chroma components. According to the disclosed embodiments, a video codec determines whether to enable the JCCR, BDPCM, palette mode, and/or ACT based on whether there exists a chroma component.

In some embodiments, the JCCR, BDPCM, and ACT flags in SPS are signaled only when chroma components exist. FIG. 14 illustrates an exemplary Table 8 showing proposed changes to the existing syntax, according to some embodiments of the present disclosure, and FIG. 15 illustrates an exemplary Table 9 showing proposed changes to the existing syntax, according to some embodiments of the present disclosure. As shown in Table 8 of FIG. 14 and Table 9 of FIG. 15, the proposed changes to the existing syntax are shown in italics and in boxes 1401-1405 and boxes 1505-1505, respectively.

In Table 8 of FIG. 14 and Table 9 of FIG. 15, the condition "ChromaArrayType!=0" may be equivalently replaced by "separate_colour_plane_flag!=1 && chroma_format_idc!=0."

FIG. 16 illustrates an exemplary Table 10 showing proposed changes to the existing syntax, according to some embodiments of the present disclosure. As shown in Table 10 of FIG. 16, the proposed changes to the existing syntax are shown in italics and in boxes 1601-1604. The palette flag (e.g., syntax element sps_palette_enabled_flag) in SPS is signaled when chroma format is 4:4:4 and chroma components exist (e.g., syntax element separate_colour_plane_flag is equal to 0). In Table 10 of FIG. 16, the condition "ChromaArrayType!=0" may be replaced by "separate_colour_plane_flag!=1 && chroma_format_idc!=0."

FIG. 17 illustrates an exemplary Table 11 showing proposed changes to the existing syntax, according to some embodiments of the present disclosure. As shown in Table 11 of FIG. 17, the proposed changes to the existing syntax are shown in italics and in boxes 1701-1705. As shown in Table 11 of FIG. 17, the palette mode is enabled for both 4:4:4 and 4:0:0 chroma formats. The condition "ChromaArrayType!=0" may be replaced by "separate_colour_plane_flag!=1 && chroma_format_idc!=0."

In some embodiments, rather than not signaling the JCCR, BDPCM, and ACT flags in SPS when chroma components do not exist, bitstream conformance is added to these flags.

Syntax element sps_joint_cbcr_enabled_flag being equal to "0" specifies that the joint coding of chroma residuals is disabled. Syntax element sps_joint_cbcr_enabled_flag being equal to "1" specifies that the joint coding of chroma residuals is enabled. It is a requirement of bitstream conformance that the value of sps_joint_cbcr_enabled_flag is equal to 0 when ChromaArrayType is equal to 0.

Syntax element sps_bdpcm_chroma_enabled_flag being equal to "1" specifies that intra_bdpcm_chroma_flag may be present in the coding unit syntax for intra coding units. Syntax element sps_bdpcm_chroma_enabled_flag being equal to "0" specifies that intra_bdpcm_chroma_flag is not present in the coding unit syntax for intra coding units. When not present, the value of sps_bdpcm_chroma_enabled_flag is inferred to be equal to 0. It is a requirement of bitstream conformance that the value of sps_bdpcm_chroma_enabled_flag is equal to 0 when ChromaArrayType is equal to 0.

Syntax element sps_act_enabled_flag being equal to 1 specifies that adaptive colour transform may be used and the cu_act_enabled_flag may be present in the coding unit syntax. Syntax element sps_act_enabled_flag being equal to 0 specifies that adaptive colour transform is not used and cu_act_enabled_flag is not present in the coding unit syntax. When sps_act_enabled_flag is not present, it is inferred to be equal to 0. It is a requirement of bitstream conformance that the value of sps_act_enabled_flag is equal to 0 when ChromaArrayType is equal to 0.

In the above bitstream conformance conditions, the condition "ChromaArrayType!=0" may be replaced by "separate_colour_plane_flag!=1 && chroma_format_idc!=0."

Figure 18:
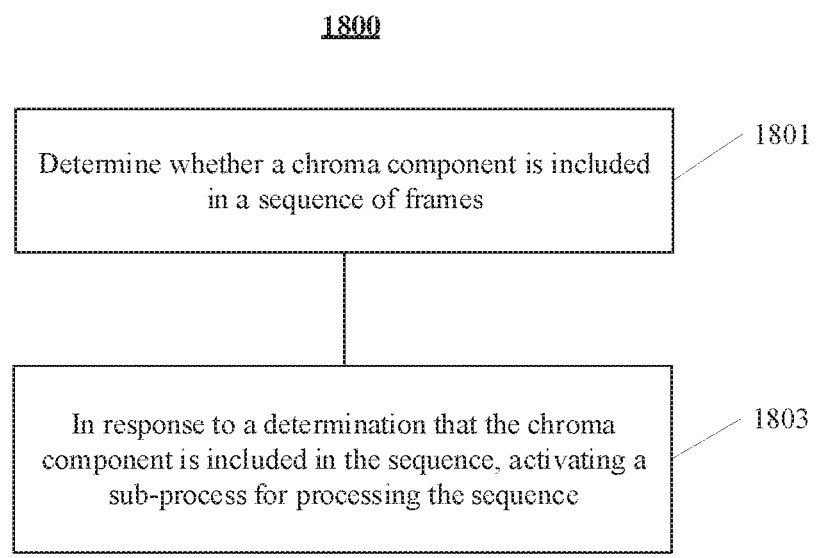
FIG. 18 illustrates a flowchart of an exemplary video processing method, according to some embodiments of the present disclosure.

FIG. 18 illustrates a flowchart of an exemplary video processing method 1800, according to some embodiments of the present disclosure. Method 1800 can be performed by an encoder (e.g., encoder 200 of FIG. 2), a decoder (e.g., decoder 300 of FIG. 3) or one or more software or hardware components of an apparatus (e.g., apparatus 400 of FIG. 4). For example, a processor (e.g., processor 402 of FIG. 4) can perform method 1800. In some embodiments, method 1800 can be implemented by a computer program product, embodied in a computer-readable medium, including computer-executable instructions, such as program code, executed by computers (e.g., apparatus 400 of FIG. 4).

At step 1801, a determination can be made on whether a chroma component is included in a sequence of frames. For example, the sequence of frames can be an input video (e.g., input video 202 of FIG. 2) or a bitstream (e.g., bitstream 220 of FIG. 2 or bitstream 302 of FIG. 3). In some embodiments, method 1800 can include determining that the chroma component is included in the sequence based on a chroma format and a separate colour plane flag. The chroma format includes a monochrome type, a 4:2:0 sampling type, a 4:2:2 sampling type, or a 4:4:4 sampling type. For example, the variable ChromaArrayType can be determined as following:
    if syntax element separate_colour_plane_flag is equal to 0, ChromaArrayType is set equal to chroma_format_idc;
    otherwise, ChromaArrayType is set equal to 0

The syntax elements separate_colour_plane_flag and chroma_format_idc can be determined according to Table 1 of FIG. 5. ChromaArrayType equal to 0 represents that there is no chroma component in the sequence, while ChromaArrayType not equal to 0 represents that there is chroma component in the sequence.

In some embodiments, method 1800 can include: determining whether a separate colour plane flag (e.g., syntax element separate_colour_plane_flag in Table 1 of FIG. 5 or Table 2 of FIG. 6) is true or false and in response to the separate colour plane flag being determined to be false, determining that the chroma component is included in the sequence.

At step 1803, in response to a determination that the chroma component is included in the sequence, a sub-process can be activated to process the chroma component. The sub-process can include one or more of JCCR, BDPCM, palette mode, or ACT. In some embodiments, method 1800 can include signaling a sub-process enable flag in SPS which indicates whether the sub-process is enabled. For example, syntax element sps_joint_cbcr_enabled_flag (e.g., as shown in Table 8 of FIG. 14, Table 9 of FIG. 15, Table 10 of FIG. 16, or Table 11 of FIG. 17) can be signalled to indicate whether JCCR is enabled. Syntax element sps_bdpcm_chroma_enabled_flag (e.g., as shown in Table 8 of FIG. 14, Table 9 of FIG. 15, Table 10 of FIG. 16, or Table 11 of FIG. 17) can be signalled to indicate whether BDPCM is enabled. Syntax element sps_palette_enabled_flag (e.g., as shown in Table 10 of FIG. 16) can be signalled to indicate whether palette mode is enabled. Syntax element sps_act_enabled_flag (e.g., as shown in Table 8 of FIG. 14, Table 9 of FIG. 15, Table 10 of FIG. 16, or Table 11 of FIG. 17) can be signalled to indicate whether ACT is enabled. In some embodiments, method 1800 can also include in response to the sub-process enable flag indicating that the sub-process is enabled, activating the sub-process for processing the chroma component. In some embodiments, in response to a determination that the chroma component is not included in the sequence, the sub-process enable flag indicates the sub-process is not enabled. For example, if ChromaArrayType is equal to 0, syntax element sps_joint_cbcr_enabled_flag, sps_bdpcm_chroma_enabled_flag, sps_palette_enabled_flag, or sps_act_enabled_flag can be equal to 0.

In some embodiments, the sequence can be processed using the activated sub-process. For example, the sequence can be processed based on Table 4 of FIG. 8, Table 5 of FIG. 9, Table 6 of FIG. 11, Table 4 of FIG. 8, Table 7 of FIG. 13, Table 8 of FIG. 14, Table 9 of FIG. 15, Table 10 of FIG. 16, or Table 11 of FIG. 17.

It is appreciated that, an embodiments of the present disclosure can be combined with another embodiments or some other embodiments.

The embodiments may further be described using the following clauses:

1. A video processing method, comprising:
   determining whether a chroma component is included in a sequence of frames; and
   in response to a determination that the chroma component is included in the sequence, activating a sub-process for processing the sequence,
   wherein the sub-process comprises one or more of joint coding for chroma residues (JCCR), block differential pulse coded modulation (BDPCM), palette mode, or adaptive color transform (ACT).
2. The method of clause 1, wherein determining whether the chroma component is included in the sequence comprises:
   determining that the chroma component is included in the sequence based on a chroma format and a separate colour plane flag.
3. The method of clause 2, wherein the chroma format comprises a monochrome type, a 4:2:0 sampling type, a 4:2:2 sampling type, or a 4:4:4 sampling type.
4. The method of any one of clauses 1-3, wherein determining whether the chroma component is included in the sequence comprises:
   determining a value of a separate colour plane flag; and
   in response to the separate colour plane flag being determined to have a first value, determining that the chroma component is included in the sequence.
5. The method of any one of clauses 1-4, wherein activating the sub-process for processing the chroma component comprises:
   signaling, in a sequence parameter set (SPS), a flag indicating whether the sub-process is enabled.
6. The method of clause 5, wherein activating the sub-process for processing the chroma component comprises:
   in response to the flag having a value indicating that the sub-process is enabled, activating the sub-process for processing the chroma component.
7. The method of any one of clauses 5 and 6, further comprising:
   wherein in response to a determination that the chroma component is not included in the sequence, setting the flag to a value indicating that the sub-process is disabled.
8. The method of any one of clauses 1-7, further comprising:
   processing the sequence using the activated sub-process.
9. A video processing apparatus, comprising:
   at least one memory for storing instructions; and
   at least one processor configured to execute the instructions to cause the apparatus to perform:
      determining whether a chroma component is included in a sequence of frames; and
      in response to a determination that the chroma component is included in the sequence, activating a sub-process for processing the chroma component,
      wherein the sub-process comprises one or more of joint coding for chroma residues (JCCR), block differential pulse coded modulation (BDPCM), palette mode, or adaptive color transform (ACT).
10. The apparatus of clause 9, wherein the at least one processor is configured to execute the instructions to cause the apparatus to perform:
    determining that the chroma component is included in the sequence based on a chroma format and a separate colour plane flag.
11. The apparatus of clause 10, wherein the chroma format comprises a monochrome type, a 4:2:0 sampling type, a 4:2:2 sampling type, or a 4:4:4 sampling type.
12. The apparatus of any one of clauses 9-11, wherein the at least one processor is configured to execute the instructions to cause the apparatus to perform:
    determining a value of a separate colour plane flag; and
    in response to the separate colour plane flag being determined to have a first value, determining that the chroma component is included in the sequence.
13. The apparatus of any one of clauses 9-12, wherein the at least one processor is configured to execute the instructions to cause the apparatus to perform:
    signaling, in a sequence parameter set (SPS), a flag indicating whether the sub-process is enabled.
14. The apparatus of clause 13, wherein the at least one processor is configured to execute the instructions to cause the apparatus to perform:
    in response to the flag having a value indicating that the sub-process is enabled, activating the sub-process for processing the chroma component.
15. The apparatus of any one of clauses 13 and 14, wherein the at least one processor is configured to execute the instructions to cause the apparatus to perform:
    in response to a determination that the chroma component is not included in the sequence, setting the flag to a value indicating that the sub-process is disabled.
16. The apparatus of any one of clauses 9-15, wherein the at least one processor is configured to execute the instructions to cause the apparatus to perform:
    processing the sequence using the activated sub-process.
17. A non-transitory computer readable storage medium storing a set of instructions that are executable by one or more processing devices to cause a video processing apparatus to perform:
    determining whether a chroma component is included in a sequence of frames; and
    in response to a determination that the chroma component is included in the sequence, activating a sub-process for processing the sequence,
    wherein the sub-process comprises one or more of joint coding for chroma residues (JCCR), block differential pulse coded modulation (BDPCM), palette mode, or adaptive color transform (ACT).
18. The non-transitory computer readable storage medium of clause 17, wherein the set of instructions are executable by the one or more processing devices to cause the video processing apparatus to perform:
    determining that the chroma component is included in the sequence based on a chroma format and a separate colour plane flag.
19. The non-transitory computer readable storage medium of clause 18, wherein the chroma format comprises a monochrome type, a 4:2:0 sampling type, a 4:2:2 sampling type, or a 4:4:4 sampling type.
20. The non-transitory computer readable storage medium of any one of clauses 17-19, wherein the set of instructions are executable by the one or more processing devices to cause the video processing apparatus to perform:

determining a value of a separate colour plane flag; and
in response to the separate colour plane flag being determined to have a first value, determining that the chroma component is included in the sequence.

21. The non-transitory computer readable storage medium of any one of clauses 17-20, wherein the set of instructions are executable by the one or more processing devices to cause the video processing apparatus to perform:
signaling, in a sequence parameter set (SPS), a flag indicating whether the sub-process is enabled.

22. The non-transitory computer readable storage medium of clause 21, wherein the set of instructions are executable by the one or more processing devices to cause the video processing apparatus to perform:
in response to the flag having a value indicating that the sub-process is enabled, activating the sub-process for processing the chroma component.

23. The non-transitory computer readable storage medium of any one of clauses 21 and 22, wherein the set of instructions are executable by the one or more processing devices to cause the video processing apparatus to perform:
in response to a determination that the chroma component is not included in the sequence, setting the flag to a value indicating that the sub-process is disabled.

24. The non-transitory computer readable storage medium of any one of clauses 17-23, wherein the set of instructions are executable by the one or more processing devices to cause the video processing apparatus to perform:
processing the sequence using the activated sub-process.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A video processing method, comprising:
determining, based on a chroma format, whether a chroma component is included in a sequence of frames;
in response to a determination that the chroma component is included in the sequence, transmitting a first flag signaling whether to activate a sub-process for processing the sequence, the sub-process comprising one or more of joint coding for chroma residues (JCCR), palette mode, or adaptive color transform (ACT); and
in response to a determination that the chroma component is not included in the sequence, determining that the sub-process for processing the sequence is deactivated, wherein the first flag is not transmitted when it is determined that the chroma component is not included in the sequence.

2. The method of claim 1, wherein determining whether the chroma component is included in the sequence comprises:
determining that the chroma component is included in the sequence based on a separate colour plane flag.

3. The method of claim 2, wherein the chroma format comprises a monochrome type, a 4:2:0 sampling type, a 4:2:2 sampling type, or a 4:4:4 sampling type.

4. The method of claim 1, wherein determining whether the chroma component is included in the sequence comprises:
determining a value of a separate colour plane flag; and
in response to the separate colour plane flag being determined to have a first value, determining that the chroma component is included in the sequence.

5. The method of claim 3, wherein activating the sub-process for processing the chroma component comprises:
   determining, for the JCCR of the sub-process, the chroma format is the monochrome type; and
   in response to the chroma format is monochrome type, stop transmitting the enabled flag which indicating the enabled flag is equal to zero.

6. The method of claim 3, wherein activating the sub-process for processing the chroma component comprises:
   determining, for the ACT of the sub-process, the chroma format is the 4:4:4 sampling type; and
   in response to the chroma format is the 4:4:4 sampling format, transmitting the enabled flag.

7. The method of claim 3, further comprising:
   determining, for the palette mode of the sub-process, the chroma format is one the monochrome type, the 4:2:0 sampling type, the 4:2:2 sampling type, or the 4:4:4 sampling type; and
   in response to the chroma format is one of the monochrome type, the 4:2:0 sampling type, the 4:2:2 sampling type, or the 4:4:4 sampling type, transmitting the enabled flag.

8. The method of claim 1, further comprising:
   processing the sequence using the activated sub-process.

9. A video processing apparatus, comprising:
   at least one memory for storing instructions; and
   at least one processor configured to execute the instructions to cause the apparatus to perform:
      determining, based on a chroma format, whether a chroma component is included in a sequence of frames;
      in response to a determination that the chroma component is included in the sequence, transmitting a first flag to determine whether to activate a sub-process for processing the sequence, the sub-process comprising one or more of joint coding for chroma residues (JCCR), palette mode, or adaptive color transform (ACT); and
      in response to the determination that the chroma component is not included in the sequence, determining that the sub-process for processing the sequence is deactivated, wherein the first flag is not transmitted when it is determined that the chroma component is not included in the sequence.

10. The apparatus of claim 9, wherein the at least one processor is configured to execute the instructions to cause the apparatus to perform:
   determining that the chroma component is included in the sequence based on a separate colour plane flag.

11. The apparatus of claim 9, wherein the at least one processor is configured to execute the instructions to cause the apparatus to perform:
   determining a value of a separate colour plane flag; and
   in response to the separate colour plane flag being determined to have a first value, determining that the chroma component is included in the sequence.

12. The apparatus of any one of claim 9, wherein the at least one processor is configured to execute the instructions to cause the apparatus to perform:
   determining, for the JCCR of the sub-process, the chroma format is a monochrome type;
   in response to the chroma format is the monochrome type, stop transmitting the enabled flag which indicating the enabled flag is equal to zero;
   determining, for the ACT of the sub-process, the chroma format is a 4:4:4 sampling type; and
   in response to the chroma format is the 4:4:4 sampling format, transmitting the enabled flag.

13. The apparatus of claim 9, wherein the at least one processor is configured to execute the instructions to cause the apparatus to perform:
   determining, for the palette mode of the sub-process, the chroma format is one a monochrome type, a 4:2:0 sampling type, a 4:2:2 sampling type, or a 4:4:4 sampling type; and
   in response to the chroma format is one of the monochrome type, the 4:2:0 sampling type, the 4:2:2 sampling type, or the 4:4:4 sampling type, transmitting the enabled flag.

14. The apparatus of claim 9, wherein the at least one processor is configured to execute the instructions to cause the apparatus to perform:
   processing the sequence using the activated sub-process.

15. A non-transitory computer readable storage medium storing a set of instructions that are executable by one or more processing devices to cause a video processing apparatus to perform:
   determining, based on a chroma format, whether a chroma component is included in a sequence of frames;
   in response to a determination that the chroma component is included in the sequence, transmitting a first flag to determine whether to activate a sub-process for processing the sequence, the sub-process comprising one or more of joint coding for chroma residues (JCCR), palette mode, or adaptive color transform (ACT); and
   in response to the determination that the chroma component is not included in the sequence, determining that the sub-process for processing the sequence is deactivated, wherein the first flag is not transmitted when it is determined that the chroma component is not included in the sequence.

16. The non-transitory computer readable storage medium of claim 15, wherein the set of instructions are executable by the one or more processing devices to cause the video processing apparatus to perform:
   determining that the chroma component is included in the sequence based on a separate colour plane flag.

17. The non-transitory computer readable storage medium of claim 15, wherein the set of instructions are executable by the one or more processing devices to cause the video processing apparatus to perform:
   determining a value of a separate colour plane flag; and
   in response to the separate colour plane flag being determined to have a first value, determining that the chroma component is included in the sequence.

18. The non-transitory computer readable storage medium of claim 15, wherein the set of instructions are executable by the one or more processing devices to cause the video processing apparatus to perform:
   determining, for the JCCR of the sub-process, the chroma format is a monochrome type;
   in response to the chroma format is the monochrome type, stop transmitting the enabled flag which indicating the enabled flag is equal to zero;
   determining, for the ACT of the sub-process, the chroma format is a 4:4:4 sampling type; and
   in response to the chroma format is the 4:4:4 sampling format, transmitting the enabled flag.

19. The non-transitory computer readable storage medium of claim 15, wherein the set of instructions are executable by the one or more processing devices to cause the video processing apparatus to perform:

determining, for the palette mode of the sub-process, the chroma format is one a monochrome type, a 4:2:0 sampling type, a 4:2:2 sampling type, or a 4:4:4 sampling type; and in response to the chroma format is one of the monochrome type, the 4:2:0 sampling type, the 4:2:2 sampling type, or the 4:4:4 sampling type, transmitting the enabled flag.

20. The non-transitory computer readable storage medium of claim 15, wherein the set of instructions are executable by the one or more processing devices to cause the video processing apparatus to perform:

processing the sequence using the activated sub-process.

21. The method of claim 1, wherein the enabled flag comprises a JCCR flag and an ACT flag, further comprising:

signaling, in the SPS, the JCCR, and ACT flags when the chroma component is included in the sequence.

* * * * *

UNITED STATES PATENT AND TRADEMARK OFFICE
CERTIFICATE OF CORRECTION

PATENT NO. : 11,356,679 B2
APPLICATION NO. : 17/063064
DATED : June 7, 2022
INVENTOR(S) : Ru-Ling Liao et al.

It is certified that error appears in the above-identified patent and that said Letters Patent is hereby corrected as shown below:

In the Claims

Claim 5, Column 19, Lines 6-7, "stop transmitting the enabled flag which indicating the enabled flag is equal to zero" should read --stop transmitting the first flag which indicates the first flag is equal to zero--.

Claim 6, Column 19, Line 13, "enabled flag" should read --first flag--.

Claim 7, Column 19, Line 23, "enabled flag" should read --first flag--.

Claim 12, Column 19, Lines 64-65, "stop transmitting the enabled flag which indicating the enabled flag is equal to zero" should read --stop transmitting the first flag which indicates the first flag is equal to zero--.

Claim 12, Column 20, Line 2, "enabled flag" should read --first flag--.

Claim 13, Column 20, Line 14, "enabled flag" should read --first flag--.

Claim 18, Column 20, Lines 58-59, "stop transmitting the enabled flag which indicating the enabled flag is equal to zero" should read --stop transmitting the first flag which indicates the first flag is equal to zero--.

Claim 18, Column 20, Line 63, "enabled flag" should read --first flag--.

Claim 19, Column 21, Line 8, "enabled flag" should read --first flag--.

Claim 21, Column 21, Line 14, "enabled flag" should read --first flag--.

Signed and Sealed this
Third Day of January, 2023

Katherine Kelly Vidal
*Director of the United States Patent and Trademark Office*